(12) United States Patent
Furtaw

(10) Patent No.: US 7,662,422 B2
(45) Date of Patent: Feb. 16, 2010

(54) CRISP MEAT-BASED FOOD SNACKS

(76) Inventor: Louis F. Furtaw, 18921 29th Ave. E., Tacoma, WA (US) 98445

( * ) Notice: Subject to any disclaimer, the term of this patent is extended or adjusted under 35 U.S.C. 154(b) by 689 days.

(21) Appl. No.: 11/100,099

(22) Filed: Apr. 5, 2005

(65) Prior Publication Data

US 2006/0222752 A1    Oct. 5, 2006

(51) Int. Cl.
 *A23L 1/31* (2006.01)
(52) U.S. Cl. ........................ 426/641; 426/443
(58) Field of Classification Search ............ 426/641, 426/443
See application file for complete search history.

(56) References Cited

U.S. PATENT DOCUMENTS

| | | | |
|---|---|---|---|
| 2,400,748 A * | 5/1946 | Flosdorf ............ 426/641 |
| 3,329,510 A | 7/1967 | Paynter et al. |
| 3,497,363 A | 2/1970 | Fox |
| 3,512,993 A | 5/1970 | Conley et al. |
| 4,212,892 A | 7/1980 | Chahine et al. |
| 4,265,918 A | 5/1981 | Kueper et al. |
| H35 H | 3/1986 | Berkowitz |
| 4,851,249 A | 7/1989 | Hamano |
| 5,262,190 A | 11/1993 | Cunningham et al. |
| 5,290,584 A | 3/1994 | Ray |
| 5,731,029 A | 3/1998 | Karwowski et al. |
| 6,060,100 A | 5/2000 | Koller |
| 6,083,554 A | 7/2000 | Parker |
| 6,086,933 A | 7/2000 | Rockstrom |
| 6,146,678 A | 11/2000 | Caridis et al. |
| 6,224,927 B1 | 5/2001 | Paulos et al. |
| 6,383,549 B1 | 5/2002 | Agostinelli |
| 6,524,633 B2 | 2/2003 | Rainbolt et al. |
| 6,699,520 B2 | 3/2004 | Paulos et al. |
| 6,706,298 B1 | 3/2004 | Villagran et al. |
| 7,357,953 B1 * | 4/2008 | Van Den Dungen et al. 426/465 |
| 2003/0039727 A1 | 2/2003 | Crocker |
| 2003/0113433 A1 | 6/2003 | Tempesta |
| 2003/0192825 A1 | 10/2003 | Chang et al. |
| 2004/0086610 A1 | 5/2004 | Allan Falk et al. |

FOREIGN PATENT DOCUMENTS

WO    WO-01/87089 A2    11/2001

OTHER PUBLICATIONS

Johnson, A. H. 1974. Encyclopedia of Food Technology. AVI Publishing Company, INc., Westport, CT. p. 282.*
MrFines.com Art Gallery, "Tur-Bacon Chips," http://www.mrfines.com/turbaconinfo.html, May 5, 2005, (30 pages).

* cited by examiner

*Primary Examiner*—Carolyn A Paden
(74) *Attorney, Agent, or Firm*—Perkins Coie LLP

(57) ABSTRACT

Meat-based food products and methods and systems for making such products are described herein. One embodiment is directed toward a method of making a meat-based food product that includes forming meat into a bulk form, heating the bulk form, and slicing the heated bulk form into a plurality of slices. The slices have first and second sides that may be spaced apart by a thickness of about 3.5 mm or less. The slices are dried in a first drying stage to produce partially dried slices that have first and second surfaces sufficiently dry to allow them to lay atop one another substantially without adhering to one another. The partially dried slices are further dried in a second drying stage by passing a drying medium through a mass of the partially dried slices. In this second drying stage, at least a substantial minority, and preferably a majority, of the partially dried slices at least partially overlie at least one other partially dried slice.

20 Claims, 3 Drawing Sheets

CRISP MEAT-BASED FOOD SNACKS

TECHNICAL FIELD

This invention generally relates to food processing and has particular utility in connection with processing meat to produce a crisp meat-based food snack.

BACKGROUND

Dried meats are often eaten as snack foods. Most such meats are sold as dry sausage (e.g., hard salami), kippered meat, or jerky. The moisture content of these dried meats varies, with dry sausage typically having moisture content (expressed as the weight percentage of water in the product) on the order of 25-40%, kippered meats having about 25-40% moisture, and jerky having about 15-30% moisture. Most meats will have a hard texture that is difficult to chew if the moisture content falls appreciably below about 15%.

Recent dietary trends have led many people to reduce carbohydrates in their diets and eat more protein. Beef jerky sales have benefited from these trends as consumers seek snacks to replace traditional starch-based snacks such as potato chips and pretzels. The chewy texture of beef jerky, however, yields a different snack experience from that associated with the light crunch of potato chips, for example. Consequently, many consumers are still drawn to carbohydrate-rich, starch-based snacks instead of beef jerky.

Some have attempted to provide a crisp meat-based snack that more closely resembles potato chips or other carbohydrate-based snacks. U.S. Pat. No. 3,497,363, for example, suggests a crisp fried meat snack formed by deep-fat frying a freeze-dried slice of meat. The freeze-drying is said to be critical to the crisp, chewable nature of the chip. Unfortunately, freeze-drying can be relatively costly on a commercial scale and deep-fat frying increases the fat content of the chips, leading to an expensive, high-fat snack.

U.S. Pat. No. 3,512,993 proposes mixing meat or seafood with water and a 50/50 blend of potato and corn starch to form a dough that is cooked under pressure and sliced. The resultant slices are dried and deep-fat fried before eating. Frying lends the chips a flaky texture instead of the "hard, horny texture" of the dried chips. This product is high in fat (with fat contents of 30-40% suggested) and starch; this makes the chips less desirable to those controlling caloric and carbohydrate intake from snack foods.

Others have posited approaches for drying sausage slices to make a snack food without having to fry the slices. U.S. Pat. No. 6,383,549 and U.S. Patent Application Publications 2003/0113433 and 2004/0039727, for example, suggest such processes. Most of these, however, are not well adapted to commercial-scale production of an inexpensive snack food and are limited to home-scale batches or expensive specialty products.

DETAILED DESCRIPTION

Several specific details of the invention are set forth in the following description and in FIGS. 1-4 to provide a thorough understanding of certain embodiments of the invention. One skilled in the art, however, will understand that the present invention may have additional embodiments, and that other embodiments of the invention may be practiced without several of the specific features described below.

A. Overview

The present disclosure describes a meat-based food product and methods and systems for making such products. As used herein, the term "meat" generally refers to animal flesh, e.g., beef, pork, lamb, chicken, turkey, ostrich, fish, shellfish, or to a combination of flesh from different animals.

One embodiment of the invention is directed toward a method of making a meat-based food product that includes forming meat into a bulk form, heating the bulk form, and slicing the heated bulk form into a plurality of slices. The slices have first and second sides that may be spaced apart by a thickness of about 3.5 mm or less. The slices are dried in a first drying stage to produce partially dried slices that have first and second surfaces sufficiently dry to allow them to lay atop one another substantially without adhering to one another. The partially dried slices are further dried in a second drying stage by passing a drying medium through a mass of the partially dried slices. In this second drying stage, at least a substantial minority, and preferably a majority, of the partially dried slices at least partially overlie at least one other partially dried slice.

Another embodiment of the invention provides a method of making a crisp meat snack. In accordance with this method, slices of a meat-based product are dried in a first drying stage to produce partially dried slices. These partially dried slices may have a moisture content of at least about 8%, e.g., 8-40%, and have substantially dry, non-tacky opposed faces. A mass of the partially dried slices may be collected in a multi-layered configuration and further dried in a second drying stage to produce crisp slices having a moisture content of no greater than about 20%, e.g., 1-20%, preferably 5-15%.

Such embodiments facilitate cost-effective commercial production of meat-based snacks. In select implementations, the resultant meat snacks may have a crisp, friable texture similar to potato chips or other starch-based snack foods, but have a relatively low carbohydrate and fat content.

B. Meat Processing System

Figure 1:
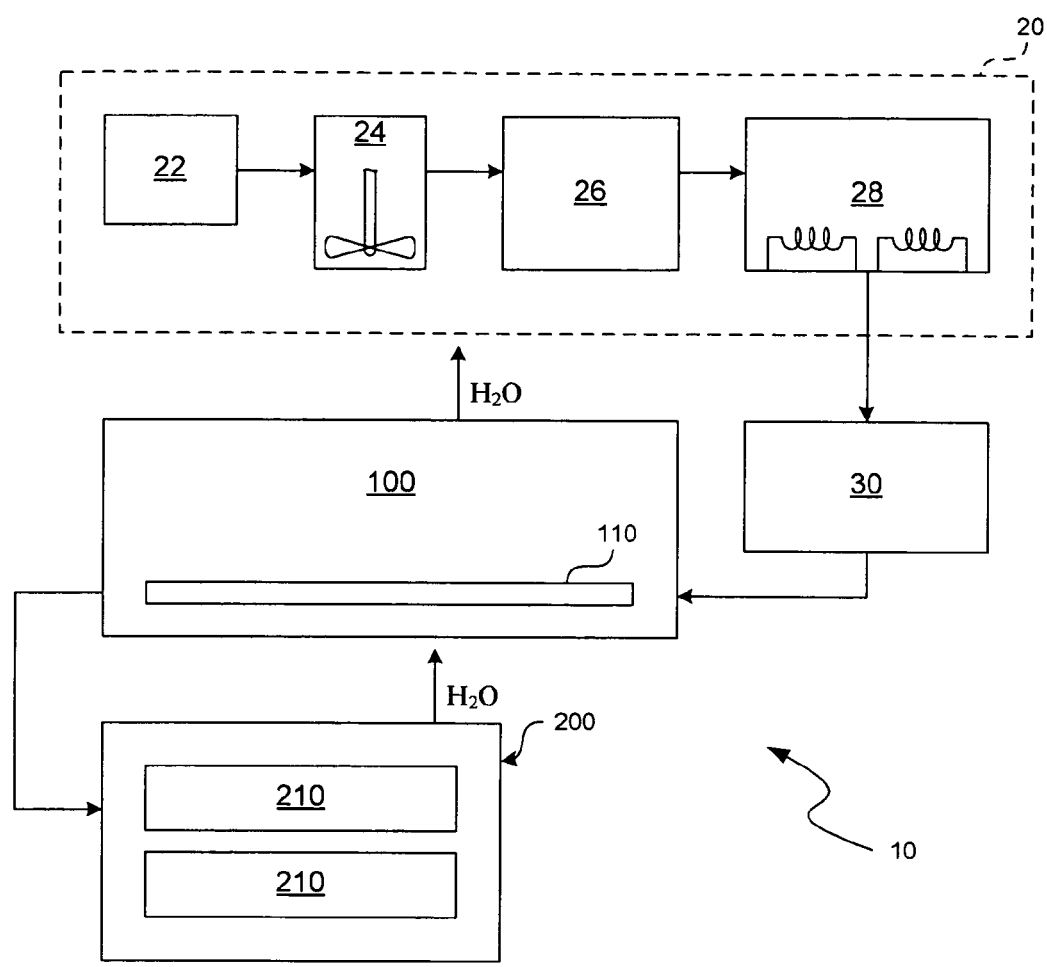
FIG. 1 is a schematic overview of a meat processing system in accordance with one aspect of the invention.

As noted above, aspects of the invention provide systems and methods for making meat-based food products. FIGS. 1-4 schematically illustrate aspects of a meat processing system 10 in accordance with an embodiment of the invention. As shown in FIG. 1, the meat processing system 10 generally includes a pre-processing system 20, a slicing station 30, a first dryer 100, and a second dryer 200. The pre-processing system 20 generally includes a meat preparation station 22, a blending station 24, a forming station 26, and a heating station 28. Meat may be prepared for processing at the preparation station 22, e.g., by cutting and abrading whole-muscle meat as discussed below. This may be done with varying degrees of automation or largely by hand. The prepared meat may be blended with other ingredients, such as flavoring or curing agents, in the blending station 24, which may be typified as an industrial food mixer.

Blended meat product from the blending station 24 may be delivered in a continuous or batch-wise manner to the forming station 26. The forming station 26 can form the blended meat product into a suitable bulk form for further processing.

In one embodiment, the forming station 26 packs the blended meat product into an edible casing, e.g., a sausage casing, of suitable size and shape. If necessary, the bulk form can be heated in the heating station 28, which may comprise a temperature- and humidity-controlled chamber in which a plurality of bulk forms are heated simultaneously.

The bulk form can be sliced into a number of relatively thin slices or other shapes in the slicing station 30. For example, the slicing station 30 may include one or more blades that cut the transverse form parallel to its longitudinal axis to produce a series of circular or ovoid slices, each of which has parallel opposed faces. In one embodiment, the faces are generally flat. In an alternative embodiment, the faces may have a ridged texture to produce ridged snack chips.

Figure 2:
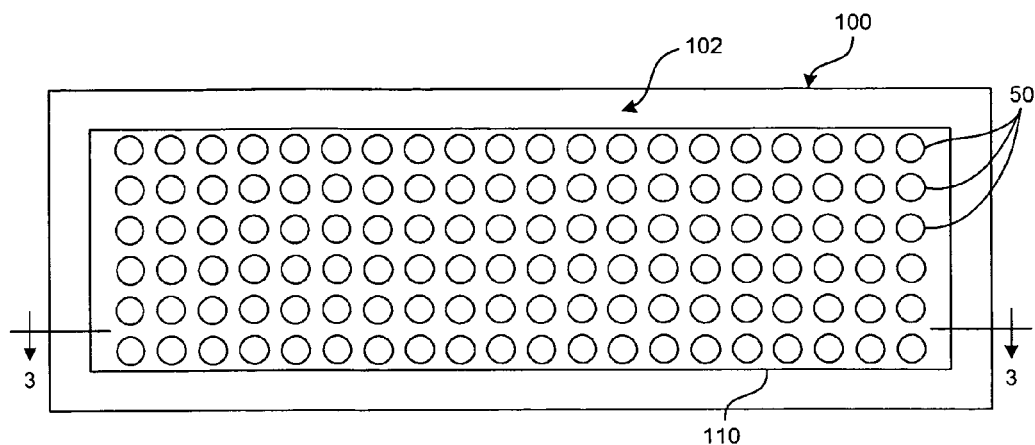
FIG. 2 is a schematic top view of one suitable first dryer for use in the system of FIG. 1.
Figure 3:
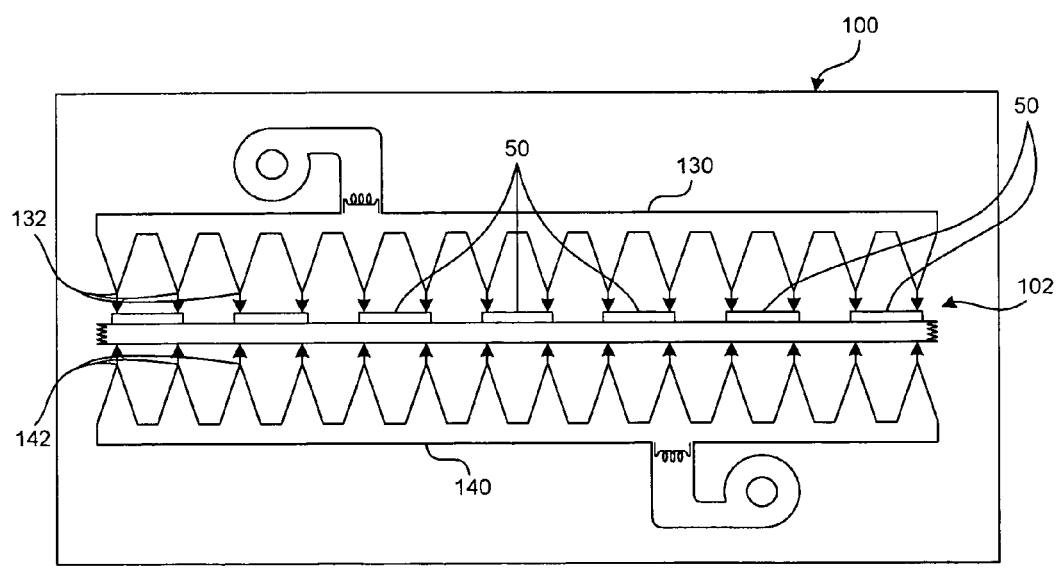
FIG. 3 is a schematic side view of the first dryer of FIG. 2 taken along line 3-3.

The slices from the slicing station 30 are delivered to the first dryer 100 for a first drying stage. As shown in FIGS. 2 and 3, one embodiment employs a first dryer 100 that includes a perforated conveyor 110 that passes through an oven cavity 102 between an upper plenum 130 and a lower plenum 140. The upper plenum 130 includes a series of upper outlets 132 that direct a drying medium downward toward the conveyor 110 and the lower plenum 140 includes a series of lower outlets 142 that direct a drying medium upward toward the conveyor 110. In one embodiment, the drying medium is a drying gas, e.g., heated air. Ovens similar to that illustrated in FIGS. 2 and 3 are commercially available from Heat and Control, Inc. of Hayward, Calif., United States, among others; U.S. Pat. No. 6,146,678 suggests use of such an oven to cook hot dogs and the like. In other embodiments, only the upper outlets 132 may flow drying gas toward the slices 50, or alternatively, only the lower outlets 142 may flow drying gas toward the slices 50. In additional embodiments, the first dryer may include a radiation element for emitting radiation to dry the slices 560 in lieu of or in addition to the drying gas.

The slices 50 may be arranged in a monolayer configuration on the conveyor 110. Doing so allows drying gas from the upper outlets 132 to impinge on the upper face of the slices 50 and drying gas from the lower outlets 142 to pass through the perforated conveyor 110 and impinge on the lower face of the slices 50, simultaneously drying both faces of the slices 50. The slices 50 shown in FIGS. 2 and 3 are arranged so that none of the slices 50 even partially overlies another slice 50. The term "monolayer configuration," however, encompasses configurations in which one or more of the slices 50 at least partially overlays another slice 50. This may happen, for example, when most of the slices 50 lie flat on the conveyor 110, but a small minority of the slices 50, e.g., no more than about 10%, preferably no more than about 5%, of the slices 50 lie partly on the conveyor 110 and partly on top of another slice 50.

Figure 4:
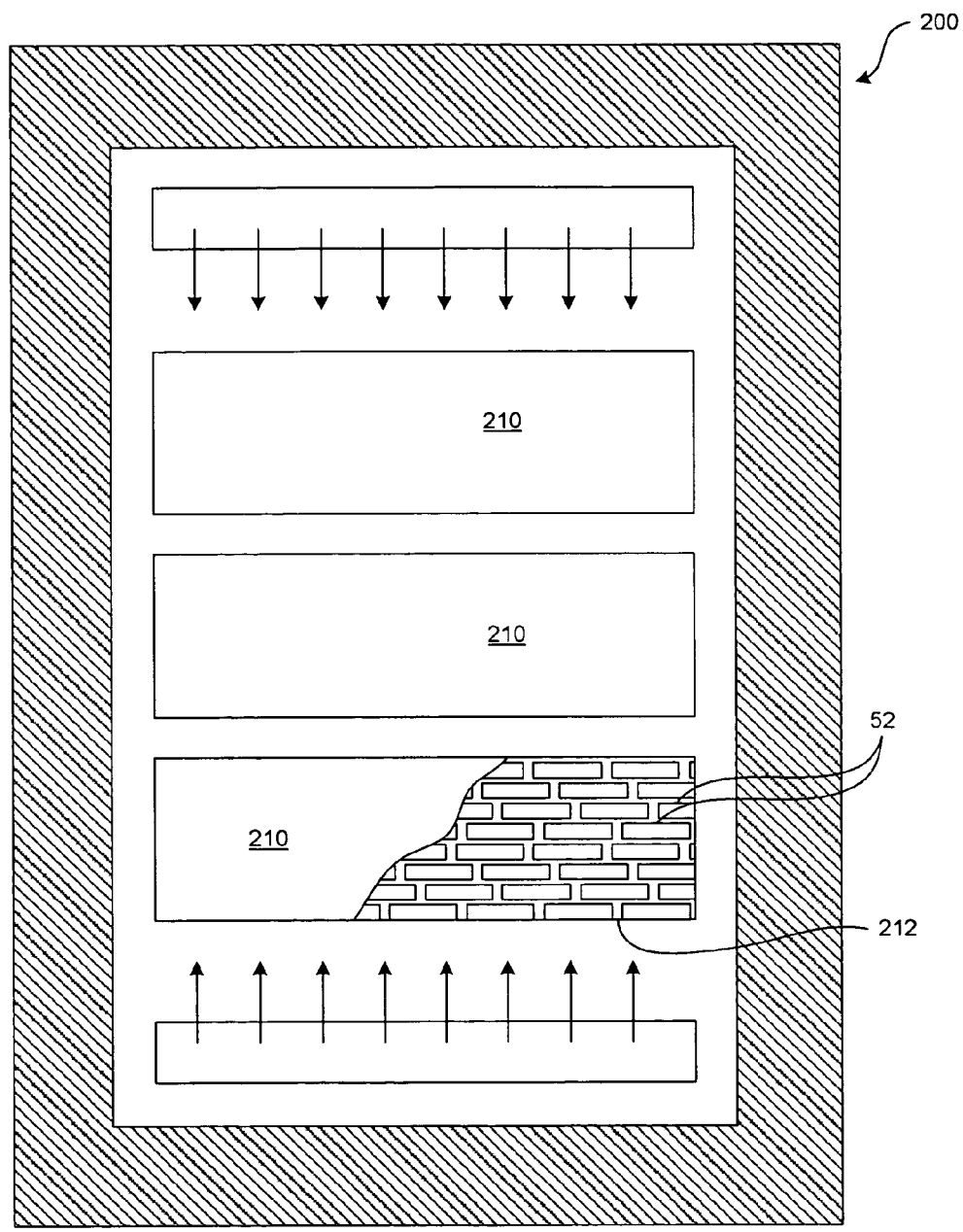
FIG. 4 is a schematic side view, in partial cross-section, of one suitable second dryer for use in the system of FIG. 1.

Processes for drying the slices 50 in the first dryer 100 are outlined below. When the first drying stage in the first dryer 100 is complete, the partially dried slices may be transferred to the second dryer 200 for heating in a second drying stage. As schematically illustrated in FIG. 4, the partially dried slices 52 may be positioned in a cavity 202 of the second dryer 200 in a multi-layer configuration. In such a configuration, at least a substantial minority, e.g., about 40% or more, of the partially dried slices 52 at least partially overlie at least one of the other slices 52. Preferably, a majority of the slices 52 at least partially overlie at least one other slice 52.

In the particular arrangement illustrated in FIG. 4, the slices 52 are held in drying trays 210. The drying trays 210 may have a perforated bottom 212 that allows a drying medium, e.g., heated air or another drying gas, to pass through the trays 210 and among the slices 52 in the trays 210. In one utile embodiment, a series of layers of the slices 52 are held in the individual trays 210, with the slices 52 being relatively randomly arranged in each layer. This facilitates the flow of the drying gas between the outer surfaces of most of the slices 52 as the gas passes through the trays 210. As suggested in FIG. 4, the second dryer 200 may be configured to hold any number of the trays 210, each tray 210 including a mass of the partially dried slices 52 therein.

C. Method of Preparing Meat-Based Food Products

As noted previously, some embodiments of the invention provide methods of preparing meat-based food products such as crisp meat snacks. For ease of understanding, the following discussion refers to the meat processing system 10 shown in FIGS. 1-4. It should be understood, though, that the methods may be practiced with any suitable apparatus and are not limited to the particular system 10 discussed above.

The meat used in forming products in accordance with the invention may be any variety or quality of meat. Most commonly, however, the meat will comprise beef or turkey. Though lower-quality finely comminuted meat of the type commonly employed in pressed-and-formed types of jerky may be used, select embodiments use whole muscle cuts of meat from which excess fat has been trimmed. This meat may be cut into suitably sized chunks, e.g., cubes about 1 inch (25 mm) on a side, in the meat preparation station 22. As is known in the art, the surface of these chunks may be abraded to enhance binding of the chunks in the bulk form.

The prepared meat can then be blended with other ingredients in the blending station 24. The nature and relative proportions of the ingredients added to the meat can be varied as desired to achieve desired taste, organoleptic, and shelf-stability characteristics. Recipes typically employed in making jerky are expected to provide suitable starting points that can be optimized to provide a final formulation. Generally, though, the meat will be mixed with salts, spices, preservatives, and sufficient water to form a solution of at least some of those additives. For example, a batch of ingredients at the blending station 24 may comprise about 80 weight percent (wt. %) meat, about 20 wt. % water, salts, and other additives. The final moisture content and water activity of the batch will depend in part on the moisture content of the prepared meat. In one embodiment, the batch of ingredients has a moisture content of about 40-80%, preferably about 55-70%, e.g., 60% and a water activity $a_w$ of about 0.9-0.999, preferably about 0.95-0.98, e.g., 0.97. In one embodiment, the fat content of the batch can vary from about 0 wt. % to about 20 wt. %; fat contents of 5 wt. % or less, e.g., about 2 wt. %, are expected to yield desirable products.

The blended meat may be formed into a suitable shape for further processing in the forming station 26. The blended meat may include sufficient binders to cause it to adhere in a solid mass in its own right. Some embodiments, though, employ a sausage casing that may be at least partially permeable to water. As is known in the art, such sausage casings may be manufactured from plastic or natural fibers, with the natural fibers typically allowing water vapor to pass through the casing wall more readily.

The resultant bulk form may take any suitable shape, such as a sausage shape having a generally circular cross section. Though the diameter will largely dictate the dimensions of the final dried product, the length will be dictated largely by practical handling and processing considerations. For example, the casing may be sized to produce sausage-like logs having a diameter of about 50-100 mm and a length of about 50-100 cm.

The bulk form can then be at least partially cooked in the heating station 28. U.S. Department of Agriculture guidelines require heating of most meat to destroy vegetative pathogens; suitable heating profiles can be adapted to variations in the type and amount of meat in the bulk form, heating conditions, the presence of curing accelerants, and other factors. For example, the bulk form may be heated in an oven at a minimum temperature of about 130-250° F. (about 55-120° C.) for about 0-24 hours. In one useful embodiment, the bulk form is heated for about 2-10 hours, e.g., about 4 hours, at a minimum oven temperature of about 140-190° F. (about 60-90° C.), e.g., about 178° F. (about 81° C.).

After heating in the heating station 28, the bulk form may have a lower moisture content and water activity than prior to heating. In one embodiment, the moisture content of the heated bulk form may be about 25-65%, e.g., 45-55%, and the water activity may be about 0.54-0.97, e.g., 0.9-0.97. Heating the bulk form may increase the weight percentage of fat in the bulk form by virtue of having lost water weight during heating. For example, the heated bulk form may contain about 0-25 wt. %, e.g., about 0-6 wt. %, fat. In one particular trial, the bulk form had a moisture content of about 60%, a water activity $a_w$ of about 0.97, and a fat content of about 2 wt. % prior to heating and heating the bulk form changed these values to about 53%, 0.95, and 2.5 wt. %, respectively.

The heated bulk form may be sliced in the slicing station 30 to produce a plurality of slices. If the slices are too thick, the final dried product may be too hard to chew comfortably; if they are too thin, they may break too easily. In one useful embodiment, the slices are no thicker than about 1 mm, preferably about 0.75 mm or thinner, e.g., about 0.6-0.75 mm. If so desired, slices thicker than about 0.75 mm may be cut with ridges, which may have periods offset from one another to provide preferred breaking planes to make it easier to eat the final dried chips.

To reduce the likelihood that the final dried meat chips will be stuck to one another, the initially cut slices 50 may be partially dried in a monolayer configuration on the conveyor 110 of the first dryer 100. The slices 50 need not be precisely arranged on the conveyor 110 and may be more than one slice thick at isolated locations; as explained above, desirably no more than about 10%, preferably no more than about 5%, of the slices 50 may lie in part atop another slice 50. A drying medium may then impinge both sides of the slices 50 to leave the surfaces of the slices 50 substantially dry, with a higher moisture content inside the partially dried slices (52 in FIG. 4). More particularly, the surfaces of the partially dried slices 52 exiting the first dryer 100 may be substantially non-tacky. This permits the slices 50 to lay atop one another during subsequent drying substantially without adhering to one another. If the slices were to adhere to one another, part of the slices would be over-dried and the stuck-together areas would be overly moist.

The drying medium in most embodiments comprises heated air. In select implementations, the incoming air temperature is about 140-450° F. (about 60-235° C.), desirably about 140-275° F. (about 60-135° C.), e.g., about 250° F. (about 121° C.) and the relative humidity of the incoming air is about 0-50%, desirably about 0-30%, e.g., about 10%. The slices 50 are dried for a relatively short time at these accelerated drying conditions to ensure that the surfaces are sufficiently dry. Suitable times may be on the order of about 15 seconds to about 60 minutes, with drying times desirably running about 0.25-15 minutes, e.g., about 8 minutes. The resultant partially dried slices 52 may have an overall moisture content of about 8-40%, preferably 20-30%, e.g., 25%, and a water activity of about 0.4-0.85, e.g., about 0.65-0.85. Again, the weight percentage of fat in the slices may increase during drying, with fat content of the partially dried slices 52 being on the order of 0-40 wt. %, preferably about 0-10 wt. %. In one embodiment, the first drying stage yields partially dried slices 52 having about 27% moisture, an $a_w$ value of about 0.75, and a fat content of no greater than about 5 wt. %, e.g., about 4 wt. %.

The partially dried slices 52 may then be dried in a second drying stage in the second dryer 200. One or more drying trays 210 may be partly or substantially filled with partially dried slices 52, with a majority of the slices 52 typically overlying at least part of at least one other slice 52. Such a multi-layer configuration reduces the space needed to dry the slices 52. If a bulk of the drying of the slices is performed in the second drying stage, the multi-layer configuration can substantially decrease the space requirement and equipment costs to produce a dried chip having the desired properties.

In one embodiment, the slices 52 are dried in the second dryer 200 to a moisture content of about 1-20%, preferably about 5-15%, e.g., 12%, and a water activity of about 0.1-0.64, preferably about 0.25-0.55. The fat content maybe about 0-40 wt. %, preferably about 10 wt. % or less, e.g., 0-5 wt. %. Like the first dryer 100, the drying medium in the second dryer 200 may be heated air. This air may have an incoming temperature of about 75-250° F. (about 25-120° C.), preferably about 140-210° F. (about 60-99° C.), and an initial relative humidity of about 0-50%, preferably about 0-30%. Drying times can vary, with typical times ranging from about 15 minutes to about 2 hours, with drying times of about 25-60 minutes being preferred. One specific trial dried the slices with 180° F. (about 82° C.) air having 10% relative humidity for about 45 minutes to produce a final dried slice or chip with a moisture content of about 12%, an $a_w$ of about 0.45, and a fat content of about 5 wt. %.

The rate at which the slices 50 are dried in the first dryer 100 may be substantially higher than the rate at which the partially dried slices 52 are dried in the second dryer 200. This will increase the throughput of the first dryer 100, which has a relatively large foot print and high equipment cost per slice being treated, and allow a bulk of the drying to take place in a more economical fashion in the second dryer 200. Separating the drying process into a relatively aggressive first drying stage and a slower second drying stage, therefore, facilitates relatively economical production of dried meat chips without undue concern that the chips will clump together during drying.

The dried chips resulting from the second drying stage are crisp and friable. Unlike traditional jerky, which tends to be fairly tough and chewy, dried meat chips, in aspects of the invention, are fairly light and crunchy. The texture of the chips may be comparable to potato chips, potato crisps, or tortilla chips. Such meat chips can satisfy one's snacking urge for starch-based snacks, such as potato chips, with a product that is much lower in carbohydrates and, optionally, significantly lower in fat than traditional potato chips or the like.

If so desired, the dried chips may be flavored with different flavoring agents to yield a range of product flavors, such as barbecue or cheese flavors. The flavoring agents may be incorporated in the batch of ingredients formed into the original bulk form. Alternatively, the dried chips may be coated with a water-based flavor slurry. In other embodiments, flavoring agents are added to the chips after they are dried, e.g., by dusting the chips with a powdered flavoring agent. As is known in the art, lightly coating the outside of the chips with corn oil or the like can help the powdered flavoring agents adhere to the chips.

The above-detailed embodiments of the invention are not intended to be exhaustive or to limit the invention to the precise form disclosed above. Specific embodiments of, and examples for, the invention are described above for illustrative purposes, but those skilled in the relevant art will recognize that various equivalent modifications are possible without deviating from the invention. For example, although the above-noted steps are presented in a given order, alternative embodiments may perform the steps in a different order. Moreover, aspects of the various embodiments described herein can be combined to provide further embodiments.

Unless the context clearly requires otherwise, throughout the description and the claims, the words "comprise," "comprising," and the like are to be construed in an inclusive sense as opposed to an exclusive or exhaustive sense, i.e., in a sense of "including, but not limited to." Use of the word "or" in reference to a list of items is intended to cover: (a) any of the items in the list; (b) all of the items in the list; and (c) any combination of the items in the list. The entirety of each of the patents and other publications mentioned above is incorporated herein by reference.

In general, the terms used in the following claims should not be construed to limit the invention to the specific embodiments disclosed in the specification unless the above-detailed description explicitly defines such terms. In addition, the inventors contemplate various aspects of the invention in any number of claim forms. Accordingly, the inventors reserve the right to add claims after filing the application to pursue such additional claim forms for other aspects of the invention.

I claim:

1. A method of making a meat-based food product, comprising:
    forming meat into a bulk form;
    heating the bulk form to at least approximately 130° F.;
    slicing the heated bulk form into a plurality of slices that have first and second sides spaced apart by a thickness no greater than about 1 mm;
    drying the slices in a first drying stage in a first dryer to produce partially dried slices, the first and second sides of the partially dried slices being sufficiently dry to allow the partially dried slices to lay atop one another without substantially adhering to one another;
    moving the partially dried slices from the first dryer to a second dryer; and
    further drying the partially dried slices in a second drying stage in the second dryer by passing a drying medium through a mass of the partially dried slices in which at least a substantial minority of the partially dried slices at least partially overlie at least one other partially dried slice.

2. The method of claim 1 wherein the second drying stage produces friable dried slices.

3. The method of claim 1 wherein the slices are arranged in a first configuration in the first drying stage and in a different configuration in the second drying stage.

4. The method of claim 1 wherein the slices are arranged in a monolayer configuration in the first drying stage.

5. The method of claim 1 wherein the slices are dried in the first drying stage by directing air against the first side and against the second side.

6. The method of claim 1 wherein the slices are dried at a first drying rate in the first drying stage and the partially dried slices are dried at a slower second drying rate in the second drying stage.

7. The method of claim 1, further comprising applying a flavoring agent to the dried slices.

8. The method of claim 7 wherein applying the flavoring agent comprises applying a water-based flavoring slurry to the dried slices after the second drying stage.

9. The method of claim 1 wherein the second drying stage produces friable dried slices having a moisture content of no greater than about 12%.

10. The method of claim 1 wherein the partially dried slices have a moisture content of at least about 25% and the second drying stage produces friable dried slices having a moisture content of no greater than about 12%.

11. The method of claim 1 wherein the bulk form comprises at least about 80 weight percent meat.

12. A method of making a crisp meat snack, comprising:
    drying slices of a meat-based product in a first drying stage in a first dryer to produce partially dried slices having a moisture content of at least about 25% and having substantially dry, non-tacky opposed faces;
    collecting a mass of the partially dried slices in a multi-layered configuration;
    moving the partially dried slices from the first dryer to a second dryer; and
    further drying the mass of partially dried slices in the multi-layered configuration in a second drying stage in the second dryer to produce crisp slices having a moisture content of no greater than about 12%.

13. The method of claim 12 wherein a majority of the partially dried slices in the multi-layered configuration have a face in contact with a face of at least one other partially dried slice.

14. The method of claim 12 wherein the first drying stage includes directing air at both faces of the slices.

15. The method of claim 12 wherein the slices are arranged in a monolayer configuration in the first drying stage.

16. The method of claim 12 wherein the slices are dried at a first drying rate in the first drying stage and the partially dried slices are dried at a slower second drying rate in the second drying stage.

17. The method of claim 12, further comprising applying a flavoring agent to the crisp slices.

18. The method of claim 12, further comprising forming the slices of the meat-based product by forming meat into a bulk form, curing the bulk form, and slicing the cured bulk form.

19. The method of claim 18 wherein the cured bulk form is sliced in an unfrozen state.

20. The method of claim 12 wherein the meat-based product comprises at least about 80 weight percent meat.

* * * * *